(12) United States Patent
Kitamura et al.

(10) Patent No.: US 10,941,217 B2
(45) Date of Patent: *Mar. 9, 2021

(54) WATER-SOLUBLE CELLULOSE ETHER AND METHOD FOR PRODUCING THE SAME

(71) Applicant: SHIN-ETSU CHEMICAL CO., LTD., Tokyo (JP)

(72) Inventors: Akira Kitamura, Joetsu (JP); Mitsuhiro Yoshida, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 16/013,088

(22) Filed: Jun. 20, 2018

(65) Prior Publication Data

US 2019/0010252 A1   Jan. 10, 2019

(30) Foreign Application Priority Data

Jul. 5, 2017 (JP) .............................. JP2017-131736
Jun. 7, 2018 (JP) .............................. JP2018-109220

(51) Int. Cl.
| | | |
|---|---|---|
| *C08B 11/08* | (2006.01) | |
| *C08B 11/02* | (2006.01) | |
| *C08B 11/20* | (2006.01) | |
| *C08B 11/193* | (2006.01) | |
| *C08B 1/08* | (2006.01) | |

(52) U.S. Cl.
CPC ............... *C08B 11/08* (2013.01); *C08B 1/08* (2013.01); *C08B 11/02* (2013.01); *C08B 11/193* (2013.01); *C08B 11/20* (2013.01)

(58) Field of Classification Search
None
See application file for complete search history.

(56) References Cited

U.S. PATENT DOCUMENTS

2001/0034441 A1   10/2001   Schlesiger et al.
2009/0165972 A1   7/2009    Narita

FOREIGN PATENT DOCUMENTS

| CN | 101469032 A | 7/2009 |
|----|-------------|--------|
| CN | 107266592 A | 10/2017 |
| EP | 2075260 A1 | 7/2009 |
| JP | 2001-240601 A | 9/2001 |
| JP | 2009-173907 A | 8/2009 |
| JP | 2014-510183 A | 4/2014 |
| WO | 2012/138531 A1 | 10/2012 |

OTHER PUBLICATIONS

Dec. 11, 2018 Extended Search Report issued in European Patent Application No. 18181254.6.
Dec. 25, 2020 Office Action issued in Chinese Patent Application No. 201810732932.3.

*Primary Examiner* — Layla D Berry
(74) *Attorney, Agent, or Firm* — Oliff PLC

(57) ABSTRACT

A method for producing a highly viscous water-soluble cellulose ether has a small undissolved fiber content and a high loose bulk density. More specifically, a production method includes steps of: bringing cellulose pulp into contact with an alkali metal hydroxide solution to obtain an alkali cellulose mixture; draining the alkali cellulose mixture to obtain an alkali cellulose; reacting the alkali cellulose with an etherifying agent to obtain a water-soluble cellulose ether mixture; washing and draining the water-soluble cellulose ether mixture to obtain a first moist cellulose ether; mixing the first moist cellulose ether with water to obtain a second moist cellulose ether; coarsely pulverizing the second moist cellulose ether with a coarse pulverizer to obtain a coarsely pulverized cellulose ether; cooling the coarsely pulverized cellulose ether; and then drying and pulverizing the coarsely pulverized cellulose ether.

5 Claims, No Drawings

WATER-SOLUBLE CELLULOSE ETHER AND METHOD FOR PRODUCING THE SAME

BACKGROUND OF THE INVENTION

1. Field of the Invention

The invention relates to a water-soluble cellulose ether used in the fields of construction materials, chemicals, pharmaceuticals, food and others, and to a method for producing the water-soluble cellulose ether.

2. Related Art

The crystallinity of a cellulose is considered to greatly depend on the intramolecular hydrogen bonds between hydroxy groups constituting the skeletal structure of the cellulose molecule. The hydrogen bond is so strong as to interfere with hydration with water molecules in water, and thus the cellulose is water-insoluble. Hence, a water-soluble cellulose ether is produced by treating a cellulose with an alkali metal hydroxide solution such as an aqueous sodium hydroxide solution to obtain alkali cellulose having the crystal structure of the cellulose destroyed, and then reacting the alkali cellulose with an etherifying agent to obtain a water-soluble cellulose ether as a result of substitution of the hydroxy groups of the cellulose.

Conventionally, water-soluble cellulose ethers have been used for pharmaceutical products, binders for foods, thickeners for various solvents, and binders for extrusion molding and ceramic-forming materials. Unless a water-soluble cellulose ether is dissolved at a molecular level to provide a transparent aqueous solution, a product may have a defective portion or have a poor function. A water-soluble cellulose ether to be used as a various binder or thickener is preferably a cellulose ether capable of providing a highly viscous aqueous solution. However, the water-soluble cellulose ether capable of providing high viscosity yields the larger number of undissolved fibers than a water-soluble cellulose ether which provides low viscosity, and is considered to be difficult to obtain a transparent aqueous solution.

Moreover, the water-soluble cellulose ether capable of providing high viscosity is likely to have a lower loose bulk density than a water-soluble cellulose ether which provides low viscosity. In general, a cellulose ether powder having a low loose bulk density contains such cellulose ether fibers as to reduce the flowability at a high content, thereby deteriorating the powder flowability. When a powder has poor flowability, for example, the powder fed from a hopper is apt to cause troubles such as powder bridging.

There is a method for producing a water-soluble cellulose ether capable of providing a highly viscous aqueous solution with a low undissolved fiber content, comprising steps of: bringing pulp having a particular pore volume into contact with an alkali metal hydroxide solution to obtain an alkali cellulose mixture, wherein the pulp is in form of a sheet or chips into which the sheet is converted; draining an excess alkali metal hydroxide solution from the alkali cellulose mixture to collect alkali cellulose; and reacting the alkali cellulose with an etherifying agent to obtain a water-soluble cellulose ether. The method excels in uniformity of alkali distribution in the alkali cellulose in comparison with a method comprising a step of bringing powder pulp into contact with an alkali metal hydroxide solution, thereby lowering the number of undissolved fibers (JP 2009-173907A).

There is another method of reducing the number of water-insoluble fibers in a water-soluble cellulose derivative, comprising steps of: adding water of 50° C. or higher to a water-soluble cellulose derivative to obtain a mixture having a water content of 35 to 90% by mass; and drying and pulverizing the mixture, while keeping the mixture at a temperature of not less than 50° C. (JP 2014-510183T, which is a Japanese phase publication of WO 2012/138531.).

There is a method of producing a water-soluble cellulose ether from a water-soluble cellulose capable of providing high viscosity comprising steps of: mixing a moist cellulose ether with water to obtain a cellulose-ether-feeding composition having a water content of 50 to 80% by mass; and pulverizing the composition in a high-speed impact mill while heating (JP 2001-240601A).

SUMMARY OF THE INVENTION

There is a room for improvement in a loose bulk density of the water-soluble cellulose ether capable of providing the high viscosity produced by the method described in JP 2009-173907A. It is because there are cases where the water-soluble cellulose ether in form of powder contains flowability-lowering cellulose ether fibers at a high content.

As for the cellulose ether capable of providing the high viscosity produced by the method described in JP 2014-510183T, water brought into contact with a water-soluble cellulose derivative has a high temperature so that the fibrous form of cellulose ether is unlikely to disappear and remains. Although the produced water-soluble cellulose ether contains flowability-lowering cellulose ether fibers at a small content as compared with that in JP 2009-173907A, it cannot have a satisfactory loose bulk density.

In the production method described in JP 2001-240601A, when a moist cellulose ether is mixed with water, only the surface of the cellulose ether lump is dissolved to form a highly viscous gelatinous film on the surface. Thus, water does not reach the inside of the lump so that water is non-uniformly distributed. Consequently, a portion in which the fibrous form of the cellulose ether does not disappear is left as a fibrous cellulose ether, thereby deteriorating the loose bulk density.

In the presence of these problems, there is a demand for a water-soluble cellulose ether, being capable of providing the high viscosity and having a small undissolved fiber content and a high loose bulk density; and a method for producing the water-soluble cellulose ether.

As a result of intensive studies for achieving the object, the inventors have found that a water-soluble cellulose ether, being capable of providing the high viscosity and having the decreased number of undissolved fibers and a high loose bulk density, can be produced by a method for producing the water-soluble cellulose comprising steps of: adjusting the water content of the washed water-soluble cellulose ether product, and coarsely pulverizing the product; and have completed the invention.

In an aspect of the invention, there is provided a method for producing a water-soluble cellulose ether, comprising steps of: bringing cellulose pulp into contact with an alkali metal hydroxide solution to obtain an alkali cellulose mixture; draining the alkali cellulose mixture to collect alkali cellulose; reacting the alkali cellulose with an etherifying agent to obtain a water-soluble cellulose ether mixture; washing and draining the water-soluble cellulose ether mixture to collect a first moist cellulose ether; mixing the first moist cellulose ether with water to obtain a second moist cellulose ether; coarsely pulverizing the second moist cellulose ether to obtain a coarsely pulverized cellulose ether; cooling the coarsely pulverized cellulose ether; and then drying and pulverizing the coarsely pulverized cellulose ether to obtain a water-soluble cellulose ether.

In another aspect of the invention, there is provided a water-soluble cellulose ether, having a loose bulk density of 0.36 to 0.60 g/ml; having a viscosity at 20° C. of 30,000 to 500,000 mPa·s as determined in a 2% by mass aqueous solution of the water-soluble cellulose ether; and containing 800 or less undissolved fibers, each fiber having a dimension of 8 to 200 μm, as determined by a Coulter counter method at 25° C. in 2 ml of a 0.1% by mass aqueous solution of the water-soluble cellulose ether.

According to the invention, a water-soluble cellulose ether, being capable of providing the high viscosity and having a high loose bulk density and the decreased number of undissolved fibers, can be efficiently produced. For example, a water-soluble cellulose ether having a loose bulk density of 0.36 to 0.60 g/ml, having a viscosity at 20° C. of 30,000 to 500,000 mPa·s as determined in a 2% by mass aqueous solution of the water-soluble cellulose ether, and containing 800 or less of undissolved fibers, each fiber having a dimension of 8 to 200 μm, as determined by a Coulter counter method at 25° C. in 2 mL of a 0.1% by mass aqueous solution of the water-soluble cellulose ether, can be produced.

DETAILED DESCRIPTION OF THE PREFERRED EMBODIMENTS

The invention will now be described in further detail.

First, a step of bringing cellulose pulp into contact with an alkali metal hydroxide solution to obtain an alkali cellulose mixture will be described.

Examples of the raw material of the cellulose pulp include wood pulp and cotton linter pulp. The wood pulp is preferable from the viewpoint of reducing the number of undissolved fibers. Examples of tree species for the wood pulp may include conifers such as pines, spruces and *Tsuga sieboldii*, and broadleaf trees such as eucalyptuses and maples. The pine is preferable from the viewpoint of reducing the number of undissolved fibers.

The intrinsic viscosity of the cellulose pulp, which is an index of the polymerization degree of the cellulose pulp, is preferably 1,300 to 3,000 ml/g, more preferably 1,400 to 2,500 ml/g, as determined in accordance with the viscosity measurement in JIS P8215 from the viewpoint of obtaining a water-soluble cellulose ether capable of providing the high viscosity.

The cellulose pulp is preferably in form of a sheet or chips from the viewpoint of handleability and drainability of the alkali cellulose.

The pulp sheet preferably has a thickness of 0.1 to 5.0 mm, more preferably 0.5 to 2.0 mm from the viewpoint of handleability during draining.

The pulp sheet preferably has a density of 0.60 g/ml or less from the viewpoint of reducing the number of undissolved fibers. The lower limit of the density of the pulp sheet may be any value that can be industrially achieved, and is typically 0.30 g/ml.

The pulp sheet preferably has an alpha-cellulose content of 90% by mass or more from the viewpoint of suppressing the reduction in the alkali absorption rate and reducing the number of undissolved fibers. The alpha-cellulose content may be determined in accordance with TEST METHOD T429 of The Technical Association of Pulp and Paper Industry (TAPPI).

The pulp sheet may be used as it is, or the pulp chips into which the pulp sheet is converted may also be used.

The shape of the pulp chip is preferably a quadrangle having a side length of 2 to 100 mm, more preferably 3 to 50 mm from the viewpoint of handleability during immersion and reducing the number of undissolved fibers. The pulp chip has substantially the same thickness as the thickness of the pulp sheet.

The pulp chips may be prepared by cutting a pulp sheet. The pulp chips may be prepared by any method, and a conventional cutter such as a slitter cutter may be used. A cutting apparatus enabling continuous cutting is more advantageous from the investment cost.

The alkali metal hydroxide solution may be any solution capable of producing alkali cellulose, and is preferably an aqueous sodium hydroxide solution or an aqueous potassium hydroxide solution from the viewpoint of economy.

The alkali metal hydroxide solution preferably has a concentration of 23 to 60% by mass, more preferably 35 to 55% by mass from the viewpoint of improving the efficiency of the reaction with an etherifying agent. The alkali metal hydroxide solution is preferably an aqueous solution, or may be an alcohol solution such as an ethanol solution or a mixed solution of a water-soluble alcohol and water.

The temperature at which cellulose pulp is brought into contact with the alkali metal hydroxide solution is preferably 5 to 70° C., more preferably 15 to 60° C. from the viewpoint of productivity and suppression of uneven alkali distribution in the alkali cellulose.

The contact time between the cellulose pulp and the alkali metal hydroxide solution is preferably 10 to 600 seconds, more preferably 15 to 120 seconds from the viewpoint of suppression of uneven distribution of alkali in the alkali cellulose and obtaining the alkali cellulose having an intended composition.

The mass ratio of the alkali metal hydroxide solution contained by the alkali cellulose mixture to the solid component in the pulp (alkali metal hydroxide solution/solid component in pulp) is preferably 3 to 5,000, more preferably 10 to 200, even more preferably 20 to 60 from the viewpoint of a facility scale and reducing the number of undissolved fibers.

The amount of the alkali metal hydroxide solution to be used may be appropriately selected depending on the above mass ratio.

The solid component in pulp means a component excluding a water component in the pulp. The solid component in pulp includes, in addition to cellulose as the main component, organic matter such as hemicelluloses, lignins and resins, and inorganic matter such as Si components and Fe components. The solid component in pulp may be calculated from a dry matter content determined in accordance with Pulps—Determination of dry matter content in JIS P8203: 1998. The dry matter content is determined by the method comprising steps of: drying a sample at 105±2° C. until the mass reaches a constant value; and dividing the mass after drying by the mass before drying to obtain the dry matter content (unit: % by mass).

Next, a step of draining (i.e. deliquoring) the alkali cellulose mixture to collect alkali cellulose will be described. The alkali cellulose may be prepared by the method comprising steps of: bringing cellulose pulp into contact with an alkali metal hydroxide solution to obtain an alkali cellulose mixture, and then draining the alkali cellulose mixture to remove an excess alkali metal hydroxide solution.

Examples of the draining method include a method comprising a steps of, after immersing a pulp sheet in an alkali metal hydroxide solution placed in a bath, pressing the resulting mixture with a roller or a similar device; and a method comprising a step of, after immersing pulp chips in an alkali metal hydroxide solution placed in a bath, subjecting the resulting mixture to centrifugation or the other mechanical separation.

The mass ratio of the alkali metal hydroxide component in the alkali cellulose to the solid component in the pulp (alkali metal hydroxide component/solid component in pulp) is preferably 0.50 to 2.00, more preferably 0.60 to 1.80 from the viewpoint of reducing the number of undissolved fibers.

By appropriately selecting the pressing time or conditions in the step of pressing, or the rotation speed of and the residence time in a centrifuge separator, alkali cellulose having an intended mass ratio of the alkali metal hydroxide component to the solid component in the pulp (alkali metal hydroxide component/solid component in pulp) may be prepared.

As for the draining temperature such as a temperature of pressing or centrifugation, the alkali cellulose mixture prepared by bringing cellulose pulp into contact with an alkali metal hydroxide solution may be drained as it is in the absence of heating or cooling.

The mass of the alkali metal hydroxide component may be determined by neutralization titration.

Next, a step of reacting the alkali cellulose with an etherifying agent to obtain a water-soluble cellulose ether mixture will be described.

The alkali cellulose may be supplied into an etherification reactor as it is or after subjected to optional cutting or disintegration. The etherification reactor is preferably a reactor with a stirring mechanism, allowing the etherification reaction to proceed while mechanically loosening the alkali cellulose, from the viewpoint of reducing the number of undissolved fibers. Examples of the reactor include a plough type shovel blade mixer. After the alkali cellulose is supplied into a reactor, the oxygen in the reactor is preferably removed by a vacuum pump or the like and replaced with an inert gas, preferably, nitrogen gas.

In order to suppress local generation of heat in the etherification reactor, an organic solvent inert to the etherification reaction, such as dimethyl ether, may be added into the system after the alkali cellulose is supplied.

Examples of the etherifying agent include an alkylating agent such as methyl chloride and ethyl chloride; and a hydroxyalkylating agent such as ethylene oxide and propylene oxide. The etherifying agent is preferably supplied after the alkali cellulose is supplied into a reactor. The etherifying agent is added in such an amount that a resulting water-soluble cellulose ether will have an intended substitution degree.

When the etherifying agent is supplied to the etherification reactor, the inside temperature of the etherification reactor is preferably 40 to 90° C., more preferably 50 to 85° C. from the viewpoint of reaction control. The supply time for supplying the etherifying agent is preferably 10 to 120 minutes, more preferably 10 to 100 minutes from the viewpoint of reaction control or productivity.

After the etherifying agent is supplied, the mixing with stirring is preferably continued in order to complete the etherification reaction. The mixing-with-stirring time after the etherifying agent is supplied is preferably 10 to 80 minutes, more preferably 20 to 60 minutes from the viewpoint of productivity. The inside temperature of the reactor after the etherifying agent is supplied is preferably 70 to 120° C., more preferably 80 to 110° C. from the viewpoint of reaction control.

When a water-soluble cellulose ether not having undergone uniform substitution reaction is dissolved in water, there remain many undissolved fibers, each fiber having a dimension of 8 to 200 μm, as determined by a Coulter counter method at 25° C. in 2 ml of a 0.1% by mass aqueous solution of the water-soluble cellulose ether.

After the completion of the etherification reaction, the gas in the etherification reactor is discharged, and then a water-soluble cellulose ether mixture is taken out of the etherification reactor.

Next, a step of washing and draining the water-soluble cellulose ether mixture to collect a first moist cellulose ether will be described.

As for the washing with a liquid (e.g. water) of more than the gelation temperature of the water-soluble cellulose ether and draining (i.e. deliquoring), the washing and the draining may be carried out separately or concurrently. For example, after washing, filtration or pressing may be carried out. Alternatively, filtration or pressing may be carried out, while adding water for washing. The washing and draining may be carried out by using a known technique. For example, the water-soluble cellulose ether mixture is dispersed in water of more than the gelation temperature for washing, and the resulting slurry of the water-soluble cellulose ether mixture is drained, followed by optional pressing.

The washing of the water-soluble cellulose ether mixture includes washing with water of a certain temperature. The washing water to be added to the water-soluble cellulose ether mixture preferably has a temperature of 60 to 100° C., more preferably 85 to 100° C. from the viewpoint of obtaining a water-soluble cellulose ether having a low ash content. The concentration of the slurry of the water-soluble cellulose ether mixture is preferably 1 to 15% by mass from the viewpoint of obtaining a water-soluble cellulose ether having a low ash content.

The temperature of the water-soluble cellulose ether mixture to be washed is the temperature after the etherification reaction, and is preferably 70 to 120° C., more preferably 80 to 110° C.

Examples of the device to be used for draining may include a vacuum filtration device, a pressure filtration device, a centrifugal dehydrator, a filter press, a screw press, and a V-type disk press. Examples of the device to be used for pressing are substantially the same as examples of the device to be used for draining.

Washing water may be successively allowed to pass through the drained water-soluble cellulose ether mixture after washing, as optional further washing. Alternatively, the filtered or pressed water-soluble cellulose ether mixture after washing may be dispersed in water as optional further washing, and the resulting slurry may be drained and pressed.

The first moist cellulose ether prepared by washing and draining may be in form of a block or loosened block owing to draining. It is preferably in form of a block from the viewpoint of preventing the draining device from becoming a complicatedly shaped and functioned.

The first moist cellulose ether prepared by washing and draining preferably has a water content of 35 to 55% by mass, more preferably 40 to 50% by mass from the viewpoint of obtaining a water-soluble cellulose ether having a low ash content. The water content of the first moist cellulose ether may be determined in accordance with "Loss on Drying Test" in the Japanese Pharmacopoeia Seventeenth Edition. The water content may be calculated as {(mass before drying mass after drying)/(mass before drying)}×100 (%).

The first moist cellulose ether prepared by washing and draining preferably has a temperature of 60 to 100° C., more preferably 80 to 95° C. in consideration of obtaining a second moist cellulose ether described later.

Next, a step of mixing the first moist cellulose ether with water to obtain a second moist cellulose ether will be described.

The method of mixing the first moist cellulose ether with water to obtain a second moist cellulose ether may be any method capable of uniform distribution of water in the second moist cellulose ether and capable of adjusting the temperature and the water content of the second moist cellulose ether to intended values. From the viewpoint of uniform distribution of water in the second moist cellulose ether, an amount of water required to convert the first moist cellulose ether into the second moist cellulose ether having a water content in a preferable range is preferably supplied together with the first moist cellulose ether into a mixer.

The water to be mixed with the first moist cellulose ether preferably has a temperature of 80 to 100° C., more preferably 90 to 100° C., regardless of a batch system or a continuous system from the viewpoint of obtaining a water-soluble cellulose ether having a high loose bulk density and achieving satisfactory operability in the following steps.

The first moist cellulose ether to be mixed with water preferably has a temperature of 60 to 100° C., more preferably 80 to 95° C., as described above. When the first moist cellulose ether has a temperature of less than 60° C., the surface of the first moist cellulose ether is dissolved to form a highly viscous gelatinous film on the surface. Consequently, when water is added in the step of obtaining a second moist cellulose ether, the water does not reach the inside of the lump of the first moist cellulose ether and is unevenly distributed in the first moist cellulose ether. As a result, the water-soluble cellulose ether may have a poor loose bulk density. On the other hand, it is difficult to produce a first moist cellulose ether of higher than 100° C.

The second moist cellulose ether obtained by mixing with water preferably has a temperature of 50 to 100° C., more preferably 70 to 95° C. from the viewpoint of obtaining uniform distribution of water in a coarsely pulverized cellulose ether and obtaining a water-soluble cellulose ether having the decreased number of undissolved fibers and a high loose bulk density.

The second moist cellulose ether obtained by mixing the first moist cellulose ether with water preferably has a water content of 60 to 90% by mass, more preferably 60 to 85% by mass, even more preferably 65 to 80% by mass from the viewpoint of obtaining a water-soluble cellulose ether having a high loose bulk density.

The water content of the second moist cellulose ether obtained by mixing the first moist cellulose ether with water may be determined in accordance with "Loss on Drying Test" in the Japanese Pharmacopoeia Seventeenth Edition as with the water content of the first moist cellulose ether.

The system of mixing the first moist cellulose ether with water may be the batch system or the continuous system. It is preferably the continuous system from the viewpoint of uniform distribution of water in the second moist cellulose ether and industrial production.

In the case of the batch system, the first moist cellulose ether is supplied together with water into a mixer with stirring and a jacket, and is mixed with stirring to obtain a second moist cellulose ether. A known mixer with stirring may be used. Examples of the mixer with stirring include a ribbon mixer, a screw mixer, a rotor mixer with pins, a paddle mixer, a mixer with paddles, a proshear mixer, a twin-screw kneader, a co-kneader, a votator kneader, a self-cleaning kneader, and a biaxial kneader.

As a preferred manner of adding water to the first moist cellulose ether in the case of the batch system, dropwise addition or spraying of water through an inlet or into the mixer with stirring may be carried out. The dropwise addition or spraying of water may be carried out at a single position or two or more positions.

The stirring speed of a mixer with stirring to be used in the batch system is preferably 0.05 to 150 m/s, more preferably 0.1 to 20 m/s, even more preferably 0.2 to 10 m/s in terms of the peripheral speed of a stirring propeller from the viewpoint of suppressing excess power consumption for stirring or evaporation of water in a stirring mixture owing to stirring heat. The mixing-with-stirring time is preferably 1 second to 60 minutes, more preferably 1 second to 30 minutes from the viewpoint of suppression of uneven distribution of water in the second moist cellulose ether or industrial production.

The mixer with stirring to be used in the batch system preferably has a temperature-holding or heating function from the viewpoint of preventing only the surface of the first moist cellulose ether from dissolving to form a highly viscous gelatinous film on the surface. For example, the mixer with stirring preferably comprises a cover of a heat-insulating material, or a jacket whose temperature is maintained at 80 to 100° C.

In the case of the continuous system, an amount of water required to convert the first moist cellulose ether into the second moist cellulose ether having a water content in a preferable range is preferably supplied together with the first moist cellulose ether into a conveyor mixer, thereby obtaining the second moist cellulose ether. Any known conveyor mixer may be used. A screw conveyor mixer capable of quantitatively supplying a first moist cellulose ether is preferable. The shape of the screw in the screw conveyor mixer is not particularly limited. A screw with a paddle or a ribbon screw is preferable from the viewpoint of uniform distribution of water in the second moist cellulose ether.

As for the running conditions of the conveyor mixer to be used in the continuous system, the shape, the pitch and the rotation speed of the screw are preferably selected so that the conveyance time is preferably 1 second to 60 minutes, more preferably 1 second to 30 minutes from the viewpoint of suppression of uneven distribution of water in the second moist cellulose ether and an appropriate size of the conveyor mixer. The temperature in the conveyor mixer is preferably 80 to 100° C., more preferably 90 to 100° C. from the viewpoint of preventing only the surface of the first moist cellulose ether from dissolving to form a highly viscous gelatinous film on the surface.

The second moist cellulose ether may be in form of a block or a block loosened by a shear force in a mixer.

The second moist cellulose ether in form of a loosened block has an average particle size of 10 to 30 mm. The average particle size is a particle size at a value of 50% in a mass-based cumulative particle size distribution by a sieve method. More specifically, the sieving is carried out in accordance with manual sieving in JIS Z 8815 (Test sieving—General requirements) using sieves having different openings: 45.0 mm for sieve-1, 37.5 mm for sieve-2, 22.4 mm for sieve-3, 16.0 mm for sieve-4, 11.2 mm for sieve-5, 8.0 mm for sieve-6, 4.0 mm for sieve-7, 2.0 mm for sieve-8, 1.0 mm for sieve-9 and 0.425 mm for sieve-10; and plotting accumulative percentages on the sieves in the Rosin-Rammler chart to select the particle size at 50% as the average particle size. It is preferable to use at least five sieves having different openings for sieving of the second moist cellulose ether. When at least five sieves are selected from the above ten sieves, the sieves having consecutive numbers connected with hyphens, such as sieve-2 to -6 or sieves-3 to -7, are preferably used from the standpoint of reproducibility and accuracy of the measured values.

Next, a step of coarsely pulverizing the second moist cellulose ether to obtain a coarsely pulverized cellulose ether will be described.

A coarse pulverizer to be used for the coarse pulverization typically pulverizes a material having high hardness such as rock and having a particle size of 500 to 2,000 mm by use of strong external force into a size of about 3 to 70 mm. Dry pulverization is typically performed to pulverize a dried material. Accordingly, it has been considered that a moist material having strong adhesiveness such as the second moist cellulose ether adheres to a surface of the coarse pulverizer and grows thereon, and it cannot be coarsely pulverized.

Surprisingly, the inventors have found that the coarse pulverizer is applicable without adhesion or growth in the coarse pulverizer and is suitable for uniform distribution of water in the second moist cellulose ether. It is because the coarse pulverizer does not excessively pulverize a moist fibrous material having strong adhesiveness such as the second moist cellulose ether, and has a short residence time in the coarse pulverizer.

The coarse pulverizer is preferably a pulverizer, for example, which allows a target material to be brought into direct contact with a pulverizing blade attached to a rotation rotor, and to be subjected to an external force such as compression, impact and shear. By application of strong compression and impact to the second moist cellulose ether, the added water present mainly around the surface of the second moist cellulose ether uniformly penetrates into the inside of the second moist cellulose ether. In addition, by concurrent application of shear, the particles of the second moist cellulose ether become finer, thereby facilitating the movement of water from the surface to the inside of the second moist cellulose ether. As a result of these effects, a coarsely pulverized cellulose ether having more uniform water distribution than that of the second moist cellulose ether can be prepared. Although pulverization and drying are often used in combination, this coarse pulverization is used for achieving more uniform water distribution so that it is not combined with drying.

The temperature of the coarse pulverization varies depending on a type of coarse pulverizer so that it may be selected appropriately in accordance of pulverization of a coarse pulverizer to be used. It is, for example, 10 to 90° C.

The water distribution in each of the second moist cellulose ether and the coarsely pulverized cellulose ether may be evaluated by the absolute value of the difference in water content between the surface part and the center part and by the water content ratio of the surface part to the center part.

Each water content of the surface part and the center part of the second moist cellulose ether or the coarsely pulverized cellulose ether is determined by the method comprising steps of: collecting several grams of samples from five different positions in the surface part and from five different positions in the center part; and measuring and averaging the water contents at the respective five positions.

The surface part is an area in contact with air and the vicinity of the area in the second moist cellulose ether or the coarsely pulverized cellulose ether, and corresponds the gathering of each position having "a ratio of the distance between the center and the position in the surface part to the maximum direct distance between the center and the circumference of the second moist cellulose ether or the coarsely pulverized cellulose ether" of 0.75 to 1.00 in terms of each cross section passing through the center thereof.

The center part corresponds to the gathering of such a position that a ratio of (the distance between the center and the position in the center part) to (the maximum direct distance between the center and the circumference of the second moist cellulose ether or the coarsely pulverized cellulose ether) is 0 to 0.25 in terms of each cross section passing through the center of the second moist cellulose ether or the coarsely pulverized cellulose ether.

Regarding each of the second moist cellulose ether and the coarsely pulverized cellulose ether, as the absolute value of the difference in water content average between the surface part and the center part is smaller and as the water content ratio of the surface part to the center part is closer to 1.00:1.00, water penetrates more into the center so that the distribution of water is more uniform.

The absolute value of the difference in water content between the surface part and the center part of the coarsely pulverized cellulose ether is preferably 0.0 to 2.5% by mass, more preferably 0.0 to 1.5% by mass from the viewpoint of obtaining satisfactory loose bulk density, and the water content ratio of the surface part to the center part is preferably 1.03:1.00 to 1.00:1.00, more preferably 1.02:1.00 to 1.00:1.00.

Examples of the coarse pulverizer include a cone crusher, an impact crusher, a hammer mill, and a feather mill. The feather mill is preferred from the viewpoint of suppression of the reduction in water content of the moist cellulose ether due to pulverization heat and suppression of excess pulverization.

The running conditions of the coarse pulverizer vary depending on a type of the coarse pulverizer. The rotation speed of the coarse pulverizer and the arrangement of a pulverizing blade in the coarse pulverizer are selected in such a manner that the coarsely pulverized cellulose ether will preferably have an average particle size of 3 to 12 mm. Depending on a type of the coarse pulverizer, an optional classification unit may be installed in the coarse pulverizer. Examples of the pulverizing blade include a knife blade, a hammer blade, and a flat blade. The knife blade is preferred from the viewpoint of uniform distribution of water in the second moist cellulose ether.

The coarsely pulverized cellulose ether preferably has an average particle size of 3 to 12 mm, more preferably 5 to 10 mm. When the coarsely pulverized cellulose ether has an average particle size of less than 3 mm, a moist cellulose ether may have a lower water content or may be excessively pulverized. When the coarsely pulverized cellulose ether has an average particle size of more than 12 mm, water may not penetrate into the center part by the coarse pulverization, so that a coarsely pulverized cellulose ether having a more uniform water distribution than that of the second moist cellulose ether may not be obtained. The average particle size of the coarsely pulverized cellulose ether is a particle size at a value of 50% in a mass-based cumulative particle size distribution by a sieve method. More specifically, the sieving is carried out in accordance with manual sieving in JIS Z 8815 (Test sieving—General requirements) using sieves having different openings: 45.0 mm for sieve-1, 37.5 mm for sieve-2, 22.4 mm for sieve-3, 16.0 mm for sieve-4, 11.2 mm for sieve-5, 8.0 mm for sieve-6, 4.0 mm for sieve-7, 2.0 mm for sieve-8, 1.0 mm for sieve-9 and 0.425 mm for sieve-10; and plotting accumulative percentages on the sieves in the Rosin-Rammler chart to select the particle size at 50% as the average particle size. It is preferable to use at least five sieves having different openings for sieving of the coarsely pulverized cellulose ether. When at least five sieves are selected from the above ten sieves, the sieves having consecutive numbers connected with hyphens, such as sieve-2 to -6 or sieve-3 to -7, are preferably used from the standpoint of reproducibility and accuracy of the measured values.

The residence time of the second moist cellulose ether in the coarse pulverizer is preferably 0.1 seconds to 3 minutes, more preferably 0.1 seconds to 2 minutes, even more preferably 0.1 seconds to 1 minute. It is difficult to set the residence time of the second moist cellulose ether in the coarse pulverizer at less than 0.1 seconds. When the residence time is more than 3 minutes, the second moist cellulose ether may have a lower water content du to pulverization heat, or may be excessively pulverized.

When a kneader or the like is used to apply a shear force, it typically takes about 5 to 10 minutes. However, a coarse pulverize does not need such a time. Hence, for example, depolymerization or excess pulverization is unlikely to be caused by an excess shear force. In particular, the reduction in viscosity or loose bulk density, or the increase in the number of undissolved fibers of a water-soluble cellulose ether capable of providing the highly viscosity can be suppressed.

The peripheral speed of a pulverizing part which applies an external force to the second moist cellulose ether in the coarse pulverizer is preferably 0.05 to 200 m/s, more preferably 0.1 to 150 m/s. When the peripheral speed is less than 0.05 m/s, the second moist cellulose ether may not be coarsely pulverized into an intended average particle size. When the peripheral speed is more than 200 m/s, the power consumption for stirring may be excess, or water may evaporate during coarse pulverization so that a water-soluble cellulose ether having a high loose bulk density may not be obtained.

If an excess pulverizing energy is generated during the coarse pulverization, the pulverization energy may be converted into heat, which may heat the second moist cellulose ether. Consequently, the water therein may evaporate so that the second moist cellulose ether may have a lower water content.

The water content reduction ratio caused by subjecting the second moist cellulose ether to the coarse pulverizer is preferably 0 to 20% by mass, more preferably 0 to 10% by mass from the viewpoint of obtaining a water-soluble cellulose ether having a high loose bulk density. The water content reduction ratio is defined by {100% by mass−(water content of coarsely pulverized cellulose ether)/(water content of second moist cellulose ether)×100}.

The water content of the second moist cellulose ether to be subjected to the coarse pulverization is preferably 60 to 90% by mass, more preferably 60 to 85% by mass, even more preferably 65 to 80% by mass from the viewpoint of obtaining a water-soluble cellulose ether having a high loose bulk density.

The water content of the second moist cellulose ether to be subjected to the coarse pulverization may be determined in accordance with "Loss on Drying Test" in the Japanese Pharmacopoeia Seventeenth Edition as with the water content of the first moist cellulose ether.

The temperature of the second moist cellulose ether to be subjected to the coarse pulverization is preferably 50 to 100° C., more preferably 70 to 95° C. from the viewpoint of uniform distribution of the water in the coarsely pulverized cellulose ether and obtaining a water-soluble cellulose ether having the decreased number of undissolved fibers and having a high loose bulk density.

Next, a step of cooling the coarsely pulverized cellulose ether, and then a step of drying and pulverizing the coarsely pulverized cellulose ether to obtain a water-soluble cellulose ether will be described.

The coarsely pulverized cellulose ether is cooled to preferably in a range of from 0 to 40° C., more preferably in a range of from 5 to 30° C., even more preferably in a range of from 5 to 20° C. from the viewpoint of obtaining a water-soluble cellulose ether having a high loose bulk density. To cool the coarsely pulverized cellulose ether, a known cooling method may be used. Examples of the cooling method include a method of bringing the coarsely pulverized cellulose ether into contact with a cooled heat-transfer surface, a method of bringing the coarsely pulverized cellulose ether into contact with cold air, and a method of utilizing vaporization heat. A cooling device used in the cooling method is applicable to either a batch system or a continuous system.

By cooling, the coarsely pulverized cellulose ether loses the fiber shape thereof so that a water-soluble cellulose ether having a high loose bulk density can be produced.

When the coarsely pulverized cellulose ether is cooled by the method of bringing a coarsely pulverized cellulose ether into contact with a cooled heat-transfer surface, a device with a jacket is preferably used for cooling. The jacket temperature is preferably 40° C. or less, more preferably −40 to 30° C. When the jacket temperature is more than 40° C., a water-soluble cellulose ether having a high loose bulk density may not be produced.

The residence time in the cooling device in the method of bringing a coarsely pulverized cellulose ether into contact with a cooled heat-transfer surface is preferably 10 seconds to 60 minutes, more preferably 1 minute to 30 minutes. When the residence time is less than 10 seconds, cooling may be insufficient so that a water-soluble cellulose ether having a high loose bulk density may not be obtained. When the residence time is more than 60 minutes, an excessively large device may be needed.

In the method of bringing a coarsely pulverized cellulose ether into contact with a cooled heat-transfer surface, static cooling or cooling with stirring may be used; The cooling with stirring is preferred from the viewpoint of more efficient cooling.

The device to be used for the cooling with stirring may be a known device. Examples thereof include a ribbon mixer, a screw mixer, a rotor mixer with pins, a paddle mixer, a mixer with paddles, a proshear mixer, a twin-screw kneader, a co-kneader, a votator kneader, a self-cleaning kneader, and a biaxial kneader.

The stirring speed of the device to be used for the cooling with stirring is preferably 0.05 to 150 m/s, more preferably 0.1 to 20 m/s, even more preferably 0.2 to 10 m/s in terms of the peripheral speed of a stirring propeller. When the stirring speed is less than 0.05 m/s, cooling may be inefficient. When the stirring speed is more than 150 m/s, the power consumption for stirring may be excess, or water in a stirring mixture may evaporate so that a water-soluble cellulose ether having a high loose bulk density may not be obtained.

The drying and the pulverization may be carried out separately or concurrently. For example, the cooled coarsely pulverized cellulose ether may be dried and then pulverized, or may be concurrently dried and pulverized. The temperature for drying and pulverization is preferably 70 to 140° C. from the viewpoint of suppressing viscosity reduction or energy consumption.

The temperature for drying and pulverization is higher than the temperature at which the coarsely pulverized cellulose ether loses the fiber shape thereof so that it does not affect the fiber shape. Hence, strict control of the temperature for drying and pulverization is not necessary to achieve a high loose bulk density.

Examples of the dryer may include a stirring dryer such as a paddle drier; a fluidized bed dryer; and a hand dryer. Examples of the pulverizer may include a ball mill, a vibration mill, an impact grinder, a roller mill, and a jet mill. Examples of the method of concurrent drying and pulverization include a method of introducing a heated gas together with the cooled coarsely pulverized cellulose ether into an impact grinder.

The water-soluble cellulose ether obtained after the drying and pulverization may be optionally sieved, and parts obtained by sieving may be optionally combined.

Examples of the water-soluble cellulose ether include an alkyl cellulose, a hydroxyalkyl cellulose, and a hydroxyalkyl alkyl cellulose.

Examples of the alkyl cellulose include methyl cellulose having a DS (degree of substitution) of methoxy group of 1.8 to 2.2 and ethyl cellulose having a DS of ethoxy group of 2.0 to 2.6 from the viewpoint of obtaining a water-soluble cellulose ether having the decreased number of undissolved fibers.

Examples of the hydroxyalkyl cellulose include hydroxyethyl cellulose having an MS (molar substitution) of hydroxyethoxy group of 2.0 to 3.0 and hydroxypropyl cellulose having an MS of hydroxypropoxy group of 2.0 to 3.3 from the viewpoint of obtaining a water-soluble cellulose ether having the decreased number of undissolved fibers.

Examples of the hydroxyalkyl alkyl cellulose include hydroxyethyl methyl cellulose having a DS of methoxy group of 1.3 to 2.2 and an MS of hydroxyethoxy group of 0.1 to 0.6, hydroxypropyl methyl cellulose having a DS of methoxy group of 1.3 to 2.2 and an MS of hydroxypropoxy group of 0.1 to 0.6, and hydroxyethyl ethyl cellulose having a DS of ethoxy group of 1.3 to 2.2 and an MS of hydroxyethoxy group of 0.1 to 0.6 from the viewpoint of obtaining a water-soluble cellulose ether having the decreased number of undissolved fibers.

The DS means the degree of substitution and is the number of alkoxy groups per glucose ring unit of a cellulose. The MS means a molar substitution and is the average molar number of hydroxy alkoxy groups added to a glucose ring unit of a cellulose. The DS and the MS may be determined by converting values obtained by the measurement in accordance with the Japanese Pharmacopoeia Seventeenth Edition.

The water-soluble cellulose ether preferably has an average particle size of 30 to 300 μm, more preferably 40 to 200 μm, even more preferably 50 to 100 μm from the viewpoint of flowability or dissolution rate. The average particle size may be determined by the measurement with a laser diffraction particle size distribution analyzer, MASTERSIZER 3000 (manufactured by Malvern) by a dry method based on the Fraunhofer diffraction theory in conditions of a dispersion pressure of 2 bar and a scattering intensity of 2 to 10%, wherein a diameter corresponding to the 50% cumulative value on a volume-based cumulative distribution curve is selected as the average particle size.

The water-soluble cellulose ether preferably has a loose bulk density of 0.36 to 0.60 g/ml, more preferably 0.37 to 0.55 g/ml. When the loose bulk density is less than 0.36 g/ml, a water-soluble cellulose ether may have poor powder flowability. When the loose bulk density is more than 0.60 g/ml, a dissolution rate of a water-soluble cellulose ether in water or others may be lowered. The "loose bulk density" is a bulk density in a loosely packed state and may be determined with a powder characteristic evaluation apparatus, POWDER TESTER PT-S, manufactured by Hosokawa Micron Corporation, by the method comprising steps of: uniformly feeding a sample powder sieved through a sieve having a mesh size of 1 mm from 23 cm above into a cylindrical stainless steel container having a diameter of 5.05 cm and a height of 5.05 cm (volume: 100 ml); then leveling off the top surface of the container; and weighing the sample in the container.

A 2% by mass aqueous solution of the water-soluble cellulose ether preferably has a viscosity at 20° C. of 30,000 to 500,000 mPa·s, more preferably 50,000 to 300,000 mPa·s from the viewpoint of viscosity and solubility suited for applications. The viscosity at 20° C. of 2% by mass aqueous solution of the water-soluble cellulose ether may be determined with a single cylinder-type rotational viscometer (Brookfield type viscometer type LV) in accordance with Method II of viscosity measurement of hypromellose in the Japanese Pharmacopoeia Seventeenth Edition.

The number of undissolved fibers, each fiber having a dimension of 8 to 200 μm, is preferably 800 or less, more preferably 750 or less in 2 ml of 0.1% by mass aqueous solution of the water-soluble cellulose ether at 25° C. from the viewpoint of product qualities. The number of undissolved fibers may be determined by a Coulter counter method with a Coulter counter or a Multisizer. More specifically, the number of undissolved fibers is determined in the method comprising steps of: dissolving a water-soluble cellulose ether in an aqueous electrolyte solution for a Coulter counter, ISOTON II (manufactured by Beckmann Coulter Corporation) in a constant temperature bath of 25° C. in such an amount as to obtain a 0.1% by mass aqueous solution; and counting the number of undissolved fibers, each fiber having a dimension of 8 μm or more and 200 μm or less present, in 2 ml of the solution by using an aperture tube having a diameter of 400 μm and a Coulter Counter TA II or a Multisizer manufactured by Coulter Corporation.

EXAMPLES

The present invention will next be described in detail with reference to Examples and Comparative Examples. It should not be construed that the invention is limited by or to Examples.

Example 1

A pulp sheet having an intrinsic viscosity of 1,800 ml/g and a thickness of 1.5 mm was immersed in a 49% by mass aqueous NaOH solution of 39° C. for 31 seconds. The mass ratio of the 49% by mass aqueous NaOH solution in the alkali cellulose mixture to the solid component in pulp was 200. Then the pulp sheet was pressed to remove an excess 49% by mass aqueous NaOH solution to obtain alkali cellulose. The mass ratio of the NaOH component in the alkali cellulose to the solid component in pulp was 1.06.

Next, 17.9 kg of the alkali cellulose was placed in an internal-stirring pressure-resistant reactor with a jacket, and vacuumed and purged with nitrogen to thoroughly remove the oxygen in the reactor. Then, the inside of the reactor was stirred while adjusting the inside temperature of the reactor to 60° C. Subsequently, 2.2 kg of dimethyl ether was added thereto, while the inside of the temperature was adjusted to 60° C. After the addition of dimethyl ether, while increasing the inside temperature of the reactor from 60° C. to 80° C., methyl chloride was added in such an amount as to make a molar ratio of (methyl chloride) to (NaOH component in alkali cellulose) to be 1.3, and propylene oxide was added in such an amount as to make a mass ratio of (propylene oxide) to (solid component in pulp) to be 0.26. After the addition of methyl chloride and propylene oxide, the inside temperature of the reactor was increased from 80° C. to 90° C., and the reaction was continued at 90° C. for another 20 minutes. The gas in the reactor was then discharged, and crude hydroxypropyl methyl cellulose was taken out of the reactor.

The crude hydroxypropyl methyl cellulose was dispersed in hot water of 95° C., and was drained to obtain a first moist cellulose ether in a block shape. The first moist cellulose ether had a temperature of 85° C. and a water content of 50% by mass.

While the first moist cellulose ether was stirred in a batch type proshear mixer being equipped with a spray nozzle and having a jacket temperature of 90° C., water of 85° C. was continuously supplied from the spray nozzle over 5 minutes thereto in such an amount that a second moist cellulose ether had a water content of 80% by mass. The mixing with stirring was continued for another 5 minutes to obtain a second moist cellulose ether. The second moist cellulose ether had a temperature of 85° C. and a water content of 80% by mass. The second moist cellulose ether had an average particle size of 15 mm, which was separately measured as the particle size at an integrated value of 50% in a mass-based cumulative particle size distribution as determined from the ratios of particles passing through five sieves having different openings (22.4 mm, 16.0 mm, 11.2 mm, 8.0 mm and 4.0 mm). Several grams of sample were collected from each of five different positions in the surface part or from each of five different positions in the center part of the second moist cellulose ether, and an average of the water contents at the five positions was calculated. The absolute value of the difference in (average) water content between the surface part to the center part was 3.5% by mass, and the water content ratio of the surface part to the center part was 1.05:1.00.

Successively, the second moist cellulose ether was coarsely pulverized with a feather mill (manufactured by Hosokawa Micron Corporation) to obtain a coarsely pulverized cellulose ether. The coarsely pulverized cellulose ether had a temperature of 60° C. and a water content of 78% by mass. Several grams of sample were collected from each of five different positions in the surface part or from each of five different positions in the center part of the coarsely pulverized cellulose ether, and an average of the water contents at the five positions was calculated. Subsequently, the absolute value of the difference in (average) water content between the surface part to the center part was calculated to be 0.5% by mass, and the water content ratio of the surface part to the center part was 1.01:1.00. The coarsely pulverized cellulose ether had an average particle size of 8 mm, which was separately measured as the particle size at an integrated value of 50% in a mass-based cumulative particle size distribution determined from the ratios of particles passing through five sieves having different openings (16.0 mm, 11.2 mm, 8.0 mm, 4.0 mm and 2.0 mm).

The residence time in the pulverizer during the coarse pulverization was about 1 second, the pulverizing blade of the coarse pulverizer was a knife blade, and the circumferential speed thereof was 79 m/s.

The obtained coarsely pulverized cellulose ether was cooled to 15° C. by being mixed and granulated in a batch type proshear mixer having a jacket temperature of 5° C., and was then introduced into an Ultra Rotor IIS impact mill (manufactured Altenburger Maschinen Jaeckering) which was driven at a pulverizing blade tip-circumferential speed of 108 m/s and was subjected to addition of a high temperature gas of 120° C. containing nitrogen at a speed of 800 m³/hr. Thus, the coarsely pulverized cellulose ether was dried and pulverized concurrently to obtain a hydroxypropyl methyl cellulose powder.

The hydroxypropyl methyl cellulose powder had a degree of substitution (DS) of methoxy group of 1.80 and a molar substitution (MS) of hydroxypropoxy group of 0.16. A viscosity at 20° C. of a 2% by mass aqueous solution of the hydroxypropyl methyl cellulose powder was 110,000 mPa·s. A loose bulk density of the hydroxypropyl methyl cellulose powder was 0.48 g/mL as determined with a powder characteristic evaluation apparatus, POWDER TESTER PT-S, manufactured by Hosokawa Micron Corporation. An average particle size of the hydroxypropyl methyl cellulose powder was 59 µm, which was determined as the particle size at an integrated value of 50% on a volume-based cumulative distribution curve obtained from the measurement by a laser diffraction particle size distribution analyzer, MASTERSIZER 3000 (manufactured by Malvern) using a dry method. The number of undissolved fibers, each fiber having a dimension of 8 to 200 µm, was 720, which was determined at 25° C. in 2 ml of a 0.1% by mass aqueous solution of the hydroxypropyl methyl cellulose powder by using a Multisizer 3 (manufactured by Beckmann Coulter Corporation). The results are summarized in Tables 1 and 2 below.

Example 2

A first moist cellulose ether in a block shape was obtained in the same manner as in Example 1. The first moist cellulose ether had a temperature of 85° C. and a water content of 45% by mass.

A second moist cellulose ether was obtained from the first moist cellulose ether in the same manner as in Example 1 except that water was supplied in such an amount that the second moist cellulose ether had a water content of 75% by mass. The second moist cellulose ether had a temperature of 85° C. and a water content of 75% by mass. The average particle size was 16 mm, which was determined in the same manner as in Example 1.

In the second moist cellulose ether, the absolute value of the difference in water content between the surface part and the center part was 3.8% by mass, and the water content ratio of the surface part to the center part was 1.05:1.00, which were determined in the same manner as in Example 1.

Subsequently, the second moist cellulose ether was coarsely pulverized in the same manner as in Example 1 to obtain a coarsely pulverized cellulose ether. The coarsely pulverized cellulose ether had a temperature of 60° C. and a water content of 73% by mass. The average particle size was 8 mm, which was determined in the same manner as in Example 1. In the coarsely pulverized cellulose ether, the absolute value of the difference in water content between the surface part and the center part was 0.8% by mass, and the water content ratio of the surface part to the center part was 1.01:1.00, which were determined in the same manner as in Example 1.

The coarsely pulverized cellulose ether was cooled to 15° C. in the same manner as in Example 1, and then was dried and pulverized concurrently to obtain a hydroxypropyl methyl cellulose powder. The hydroxypropyl methyl cellulose powder had a degree of substitution (DS) of methoxy group of 1.80 and a molar substitution (MS) of hydroxypropoxy group of 0.16. A viscosity at 20° C. of a 2% by mass aqueous solution of the hydroxypropyl methyl cellulose powder was 103,000 mPa·s. A loose bulk density of the hydroxypropyl methyl cellulose powder was 0.46 g/mL, a volume-based average particle size thereof was 62 μm by dry laser diffractometry, and the number of undissolved fibers, each fiber having a dimension of 8 to 200 μm, was 680 at 25° C. in 2 ml of a 0.1% by mass aqueous solution thereof, which were determined in the same manner as in Example 1. The results are summarized in Tables 1 and 2 below.

Example 3

A pulp sheet having an intrinsic viscosity of 2,000 ml/g and a thickness of 1.2 mm was immersed in a 49% by mass aqueous NaOH solution of 39° C. for 40 seconds. The mass ratio of the 49% by mass aqueous NaOH solution in the alkali cellulose mixture to the solid component in pulp was 200. Then, the pulp sheet was pressed to remove an excess 49% by mass aqueous NaOH solution to obtain alkali cellulose. The mass ratio of the NaOH component in the alkali cellulose to the solid component in pulp was 1.25.

Next, 20.0 kg of the alkali cellulose was placed in an internal-stirring pressure-resistant reactor with a jacket, and vacuumed and purged with nitrogen to thoroughly remove the oxygen in the reactor. The inside of the reactor was stirred, while the inside temperature of the reactor was adjusted to 60° C. Subsequently, 2.2 kg of dimethyl ether was added, while the inside temperature of the reactor was adjusted to 60° C. After the addition of dimethyl ether, while increasing the inside temperature of the reactor from 60° C. to 80° C., methyl chloride was added in such an amount as to make a molar ratio of (methyl chloride) to (NaOH component in alkali cellulose) to be 1.3, and propylene oxide was added in such an amount to make a mass ratio of (propylene oxide) to (solid component in pulp) to be 0.52. After the addition of methyl chloride and propylene oxide, the inside temperature of the reactor was increased from 80° C. to 90° C., and the reaction was continued at 90° C. for another 20 minutes. The gas in the reactor was then discharged, and a crude hydroxypropyl methyl cellulose was taken out of the reactor.

A first moist cellulose ether in a block shape was obtained from the crude hydroxypropyl methyl cellulose in the same manner as in Example 1. The first moist cellulose ether had a temperature of 85° C. and a water content of 49% by mass.

A second moist cellulose ether was obtained from the first moist cellulose ether in the same manner as in Example 1 except that the jacket temperature was 80° C. and water was supplied in such an amount that the second moist cellulose ether had a water content of 65% by mass. The second moist cellulose ether had a temperature of 75° C. and a water content of 65% by mass. The average particle size was 16 mm, which was determined in the same manner as in Example 1.

In the second moist cellulose ether, the absolute value of the difference in water content between the surface part and the center part was 2.8% by mass, and the water content ratio of the surface part to the center part was 1.05:1.00, which were determined in the same manner as in Example 1.

Subsequently, the second moist cellulose ether was coarsely pulverized in the same manner as in Example 1 to obtain a coarsely pulverized cellulose ether. The coarsely pulverized cellulose ether had a temperature of 55° C. and a water content of 64% by mass. The average particle size was 7 mm, which was determined in the same manner as in Example 1. In the coarsely pulverized cellulose ether, the absolute value of the difference in water content between the surface part and the center part was 0.5% by mass, and the water content ratio of the surface part to the center part was 1.01:1.00, which were determined in the same manner as in Example 1.

The coarsely pulverized cellulose ether was cooled to 15° C. in the same manner as in Example 1 and then was dried and pulverized concurrently to obtain a hydroxypropyl methyl cellulose powder. The hydroxypropyl methyl cellulose powder had a degree of substitution (DS) of methoxy group of 1.90 and a molar substitution (MS) of hydroxypropoxy group of 0.24. A viscosity at 20° C. of a 2% by mass aqueous solution of the hydroxypropyl methyl cellulose powder was 110,000 mPa·s. A loose bulk density of the hydroxypropyl methyl cellulose powder was 0.43 g/mL, a volume-based average particle size thereof was 65 μm by dry laser diffractometry, and the number of undissolved fibers, each fiber having a dimension of 8 to 200 μm, was 260 at 25° C. in 2 ml of a 0.1% by mass aqueous solution thereof. The results are summarized in Tables 1 and 2 below.

Example 4

A first moist cellulose ether in a block shape was obtained in the same manner as in Example 1. The first moist cellulose ether had a temperature of 85° C. and a water content of 45% by mass.

The first moist cellulose ether was supplied at 10 kg/hr to a screw conveyor held at 80° C., and concurrently hot water of 95° C. was added at 8.33 kg/hr from an inlet of the screw conveyor-type conveyor, thereby obtaining a second moist cellulose ether in a block shape and being discharged from an outlet of the screw conveyor. The second moist cellulose ether had a temperature of 80° C. and a water content of 70% by mass. The second moist cellulose ether in a block shape was loosened by hands. In the loosened second moist cellulose ether, the absolute value of the difference in water content between the surface part and the center part was 3.6% by mass, and the water content ratio of the surface part to the center part was 1.05:1.00, which were determined in the same manner as in Example 1.

Subsequently, the second moist cellulose ether was coarsely pulverized in the same manner as in Example 1 to obtain a coarsely pulverized cellulose ether. The coarsely pulverized cellulose ether had a temperature of 60° C. and a water content of 69% by mass. The average particle size was 7 mm, which was determined in the same manner as in Example 1. In the coarsely pulverized cellulose ether, the absolute value of the difference in water content between the surface part and the center part was 0.6% by mass, and the water content ratio of the surface part to the center part was 1.01:1.00, which were determined in the same manner as in Example 1.

The coarsely pulverized cellulose ether was cooled to 15° C. in the same manner as in Example 1, and then was dried and pulverized concurrently to obtain a hydroxypropyl methyl cellulose powder. The hydroxypropyl methyl cellulose powder had a degree of substitution (DS) of methoxy groups of 1.80 and a molar substitution (MS) of hydroxypropoxy groups of 0.16. A viscosity at 20° C. of a 2% by mass aqueous solution of the hydroxypropyl methyl cellulose powder was 106,000 mPa·s. A loose bulk density of The hydroxypropyl methyl cellulose powder was 0.41 g/mL, a volume-based average particle size thereof was 63 μm by dry laser diffractometry, and the number of undissolved fibers, each fiber having a dimension of 8 to 200 μm, was 550 at 25° C. in 2 ml of a 0.1% by mass aqueous solution thereof. The results are summarized in Tables 1 and 2 below.

Example 5

A first moist cellulose ether in a block shape was obtained in the same manner as in Example 1. The first moist cellulose ether had a temperature of 85° C. and a water content of 45% by mass.

A second moist cellulose ether in a block shape was obtained from the first moist cellulose ether in the same manner as in Example 4 except that hot water of 95° C. was supplied at 5.71 kg/hr. The second moist cellulose ether had a temperature of 75° C. and a water content of 65% by mass. The second moist cellulose ether in a block shape was loosened by hands. In the loosened second moist cellulose ether, the absolute value of the difference in water content between the surface part and the center part was 3.5% by mass, and the water content ratio of the surface part to the center part was 1.06:1.00, which were determined in the same manner as in Example 1.

Subsequently, the second moist cellulose ether was coarsely pulverized in the same manner as in Example 1 to obtain a coarsely pulverized cellulose ether. The coarsely pulverized cellulose ether had a temperature of 50° C. and a water content of 64% by mass. The average particle size was 8 mm, which was determined in the same manner as in Example 1. In the coarsely pulverized cellulose ether, the absolute value of the difference in water content between the surface part and the center part was 0.7% by mass, and the water content ratio of the surface part to the center part was 1.01:1.00, which were determined in the same manner as in Example 1.

The coarsely pulverized cellulose ether was cooled to 15° C. in the same manner as in Example 1, and then was dried and pulverized concurrently to obtain a hydroxypropyl methyl cellulose powder. The hydroxypropyl methyl cellulose powder had a degree of substitution (DS) of methoxy group of 1.80 and a molar substitution (MS) of hydroxypropoxy group of 0.16. A viscosity at 20° C. of a 2% by mass aqueous solution of the hydroxypropyl methyl cellulose powder was 110,000 mPa·s. A loose bulk density of the hydroxypropyl methyl cellulose powder was 0.37 g/mL, a volume-based average particle size thereof was 63 μm by dry laser diffractometry, and the number of undissolved fibers, each fiber having a dimension of 8 to 200 was 500 at 25° C. in 2 ml of a 0.1% by mass aqueous solution thereof. The results are summarized in Tables 1 and 2 below.

Example 6

A first moist cellulose ether in a block shape was obtained in the same manner as in Example 3. The first moist cellulose ether had a temperature of 85° C. and a water content of 48% by mass.

A second moist cellulose ether in a block shape was obtained from the first moist cellulose ether in the same manner as in Example 4 except that hot water of 95° C. was supplied at 5.41 kg/hr. The second moist cellulose ether had a temperature of 75° C. and a water content of 65% by mass.

The second moist cellulose ether in a block shape was loosened by hands. In the loosened second moist cellulose ether, the absolute value of the difference in water content between the surface part and the center part was 4.0% by mass, and the water content ratio of the surface part to the center part was 1.07:1.00, which were determined in the same manner as in Example 1.

Subsequently, the second moist cellulose ether was coarsely pulverized in the same manner as in Example 1 to obtain a coarsely pulverized cellulose ether. The coarsely pulverized cellulose ether had a temperature of 55° C. and a water content of 64% by mass. The average particle size was 7 mm, which was determined in the same manner as in Example 1. In the coarsely pulverized cellulose ether, the absolute value of the difference in water content between the surface part and the center part was 0.6% by mass, and the water content ratio of the surface part to the center part was 1.01:1.00, which were determined in the same manner as in Example 1.

The coarsely pulverized cellulose ether was cooled to 15° C. in the same manner as in Example 1, then was dried with an air dryer set at 80° C. for 8 hours, and was pulverized with a vibration mill, CH-20 (manufactured by Chuo Kakohki Co., Ltd.). The pulverized product was sieved with a Gyro-Sifter GS-A1H (manufactured by TOKUJU CORPORATION) to remove coarse cellulose ether, thereby obtaining a hydroxypropyl methyl cellulose powder. The hydroxypropyl methyl cellulose powder had a degree of substitution (DS) of methoxy group of 1.90 and a molar substitution (MS) of hydroxypropoxy group of 0.24. A viscosity at 20° C. of a 2% by mass aqueous solution of the hydroxypropyl methyl cellulose powder was 83,000 mPa·s. A loose bulk density of the hydroxypropyl methyl cellulose powder was 0.38 g/mL, a volume-based average particle size thereof was 70 μm by dry laser diffractometry, and the number of undissolved fibers, each fiber having a dimension of 8 to 200 μm, was 320 at 25° C. in 2 ml of a 0.1% by mass aqueous solution thereof. The results are summarized in Tables 1 and 2 below.

Example 7

A pulp sheet having an intrinsic viscosity of 1,900 ml/g and a thickness of 1.2 mm was made into 15-mm-square chips. The pulp chips were immersed in a 49% by mass aqueous NaOH solution of 32° C. for 34 seconds. The mass ratio of 49% by mass aqueous NaOH solution in the alkali cellulose mixture to the solid component in pulp was 15. Then, the pulp sheet was pressed by using a rotary basket having a centrifugal effect of 600 to remove an excess 49% by mass aqueous NaOH solution, thereby obtaining alkali cellulose. The mass ratio of NaOH component in the alkali cellulose to the solid component in pulp was 1.059. A crude hydroxypropyl methyl cellulose was obtained from the alkali cellulose as the raw material in the same manner as in Example 1.

The crude hydroxypropyl methyl cellulose was dispersed in hot water in the same manner as in Example 1 and then was drained to obtain a first moist cellulose ether in a block shape. The first moist cellulose ether had a temperature of 85° C. and a water content of 48% by mass.

A second moist cellulose ether in a block shape was obtained from the first moist cellulose ether in the same manner as in Example 4 except that hot water of 95° C. was supplied at 8.03 kg/hr. The second moist cellulose ether had a temperature of 80° C. and a water content of 70% by mass.

The second moist cellulose ether in a block shape was loosened by hands. In the loosened second moist cellulose ether, the absolute value of the difference in water content between the surface part and the center part was 4.8% by mass, and the water content ratio of the surface part to the center part was 1.07:1.00, which were determined in the same manner as in Example 1.

Subsequently, the second moist cellulose ether was coarsely pulverized in the same manner as in Example 1 to obtain a coarsely pulverized cellulose ether. The coarsely pulverized cellulose ether had a temperature of 60° C. and a water content of 69% by mass. The average particle size was 7 mm, which was determined in the same manner as in Example 1. In the coarsely pulverized cellulose ether, the absolute value of the difference in water content between the surface part and the center part was 0.6% by mass, and the water content ratio of the surface part to the center part was 1.01:1.00, which were determined in the same manner as in Example 1.

The coarsely pulverized cellulose ether was cooled to 15° C. in the same manner as in Example 1 and was subjected to the same procedure as in Example 6 to obtain a hydroxypropyl methyl cellulose powder. The hydroxypropyl methyl cellulose powder had a degree of substitution (DS) of methoxy group of 1.80 and a molar substitution (MS) of hydroxypropoxy group of 0.16. A viscosity at 20° C. of a 2% by mass aqueous solution of the hydroxypropyl methyl cellulose powder was 83,000 mPa·s. A loose bulk density of the hydroxypropyl methyl cellulose powder was 0.37 g/mL, a volume-based average particle size thereof was 65 μm by dry laser diffractometry, and the number of undissolved fibers, each fiber having a dimension of 8 to 200 μm, was 680 at 25° C. in 2 ml of a 0.1% by mass aqueous solution thereof. The results are summarized in Tables 1 and 2 below.

Comparative Example 1

A first moist cellulose ether in a block shape was obtained in the same manner as in Example 1. The first moist cellulose ether had a temperature of 85° C. and a water content of 46% by mass.

In the same manner as in Example 1, the first moist cellulose ether was granulated with stirring in a proshear mixer, being equipped with a spray nozzle and having a jacket temperature of 60° C., while water of 60° C. was continuously supplied thereto through the spray nozzle over 5 minutes in such an amount that a second moist cellulose ether had a water content of 70% by mass. After the water was supplied, mixing with stirring was continued for 20 minutes to obtain the second moist cellulose ether. The second moist cellulose ether had a temperature of 60° C. and a water content of 70% by mass. The second moist cellulose ether had an average particle size of 10 mm, which was separately measured as the particle size at an integrated value of 50% in a mass-based cumulative particle size distribution determined from ratios of particles passing through five sieves having different openings (16.0 mm, 11.2 mm, 8.0 mm, 4.0 mm and 2.0 mm). In the second moist cellulose ether, the absolute value of the difference in water content between the surface part and the center part was 4.5% by mass, and the water content ratio of the surface part to the center part was 1.07:1.00, which were determined in the same manner as in Example 1. It was confirmed that the penetration of water into the center part had been insufficient.

The second moist cellulose ether was not subjected to the coarse pulverization, and was dried and pulverized concurrently in the same manner as in Example 1 to obtain a hydroxypropyl methyl cellulose powder. The hydroxypropyl methyl cellulose powder had a degree of substitution (DS) of methoxy group of 1.80 and a molar substitution (MS) of hydroxypropoxy group of 0.16. A viscosity at 20° C. of a 2% by mass aqueous solution of the hydroxypropyl methyl cellulose powder was 100,000 mPa·s. A low loose bulk density of the hydroxypropyl methyl cellulose powder was 0.10 g/mL, a volume-based average particle size thereof was 150 μm by dry laser diffractometry, and the number of undissolved fibers, each fiber having a dimension of 8 to 200 μm, was as large as 1,100 at 25° C. in 2 ml of a 0.1% by mass aqueous solution thereof. The results are summarized in Tables 1 and 2 below.

Comparative Example 2

A first moist cellulose ether in a block shape was obtained in the same manner as in Example 1. The first moist cellulose ether had a temperature of 85° C. and a water content of 45% by mass.

The first moist cellulose ether was supplied at 10 kg/hr to a screw conveyor held at 80° C., and concurrently hot water of 95° C. was added at 8.33 kg/hr from an inlet of the screw conveyor, thereby obtaining a second moist cellulose ether in a block shape and being discharged from an outlet of the screw conveyor. The second moist cellulose ether had a temperature of 80° C. and a water content of 70% by mass. In the second moist cellulose ether, the absolute value of the difference in water content between the surface part and the center part was 3.2% by mass, and the water content ratio of the surface part to the center part was 1.05:1.00, which were determined in the same manner as in Example 1. It was confirmed that the penetration of water into the center part had been insufficient.

The second moist cellulose ether was not subjected to the coarse pulverization and was cooled in the same manner as in Example 1, and then dried and pulverized concurrently to obtain a hydroxypropyl methyl cellulose powder. The hydroxypropyl methyl cellulose powder had a degree of substitution (DS) of methoxy group of 1.80 and a molar substitution (MS) of hydroxypropoxy group of 0.16. A viscosity at 20° C. of a 2% by mass aqueous solution of the hydroxypropyl methyl cellulose powder was 100,000 mPa·s. A loose bulk density of the hydroxypropyl methyl cellulose powder was as small as 0.21 g/mL, a volume-based average particle size thereof was 80 μm by dry laser diffractometry, and the number of undissolved fibers, each fiber having a dimension of 8 to 200 μm, was as many as 900 at 25° C. in 2 ml of a 0.1% by mass aqueous solution thereof. The results are summarized in Tables 1 and 2 below.

TABLE 1

| | form of cellulose pulp | first moisture cellulose ether | | | second moisture cellulose ether | | | | | coarsely pulverized cellulose ether | | | | | drying and pulverization |
|---|---|---|---|---|---|---|---|---|---|---|---|---|---|---|---|
| | | temp. (° C.) | water content (%) | form | temp. (° C.) | water content (%) | apparatus *1 | form | average particle size by sieving (mm) | use of coarse pulverizer | temp. (° C.) | water content (%) | average particle size by sieving (mm) | temp. after cooling (° C.) | |
| Example 1 | sheet | 85 | 50 | block | 85 | 80 | P | — | 15 | used | 60 | 78 | 8 | 15 | concurrent |
| Example 2 | sheet | 85 | 45 | block | 85 | 75 | P | — | 16 | use | 60 | 73 | 8 | 15 | concurrent |
| Example 3 | sheet | 85 | 49 | block | 75 | 65 | P | — | 16 | used | 55 | 64 | 7 | 15 | concurrent |
| Example 4 | sheet | 85 | 45 | block | 80 | 70 | SC | block | — | used | 60 | 69 | 7 | 15 | concurrent |
| Example 5 | sheet | 85 | 45 | block | 75 | 65 | SC | block | — | used | 50 | 64 | 8 | 15 | concurrent |
| Example 6 | sheet | 85 | 48 | block | 75 | 65 | SC | block | — | used | 55 | 64 | 7 | 15 | drying followed by pulverization |
| Example 7 | chips | 85 | 48 | block | 80 | 70 | SC | block | — | used | 60 | 69 | 7 | 15 | drying followed by pulverization |
| Comp. Ex. 1 | sheet | 85 | 46 | block | 60 | 70 | P | — | 10 | not used | — | — | — | — | concurrent |
| Comp. Ex. 2 | sheet | 85 | 45 | block | 80 | 70 | SC | block | — | not used | — | — | — | — | concurrent |

*1 "P" means a proshear mixer equipped with a spray nozzle and "SC" means a screw conveyer mixer.

TABLE 2

| | | | water-soluble cellulose ether | | | |
|---|---|---|---|---|---|---|
| | DS | MS | volume-based average particle size (µm) | loose bulk density (g/ml) | viscosity at 20° C. of 2% by mass aq. solution (mPa · s) | number of undissolved fibers (pieces) |
| Example 1 | 1.80 | 0.16 | 59 | 0.48 | 110000 | 720 |
| Example 2 | 1.80 | 0.16 | 62 | 0.46 | 103000 | 680 |
| Example 3 | 1.90 | 0.24 | 65 | 0.43 | 110000 | 260 |
| Example 4 | 1.80 | 0.16 | 63 | 0.41 | 106000 | 550 |
| Example 5 | 1.80 | 0.16 | 63 | 0.37 | 110000 | 500 |
| Example 6 | 1.90 | 0.24 | 70 | 0.38 | 83000 | 320 |
| Example 7 | 1.80 | 0.16 | 65 | 0.37 | 83000 | 680 |
| Comp. Ex. 1 | 1.80 | 0.16 | 150 | 0.10 | 100000 | 1100 |
| Comp. Ex. 2 | 1.80 | 0.16 | 80 | 0.21 | 100000 | 900 |

The invention claimed is:

1. A method for producing a water-soluble cellulose ether, comprising steps of:
   bringing cellulose pulp into contact with an alkali metal hydroxide solution to obtain an alkali cellulose mixture;
   draining the alkali cellulose mixture to obtain alkali cellulose;
   reacting the alkali cellulose with an etherifying agent to obtain a water-soluble cellulose ether mixture;
   washing and draining the water-soluble cellulose ether mixture to obtain a first moist cellulose ether;
   mixing the first moist cellulose ether with water to obtain a second moist cellulose ether;
   coarsely pulverizing the second moist cellulose ether to obtain a coarsely pulverized cellulose ether;
   cooling the coarsely pulverized cellulose ether; and
   then drying and pulverizing the coarsely pulverized cellulose ether to obtain a water-soluble cellulose ether,
   wherein the coarsely pulverized cellulose ether obtained in the step of coarsely pulverizing the second moist cellulose ether has an average particle size, as determined by a sieve method, of 3 to 12 mm.

2. The method for producing a water-soluble cellulose ether according to claim 1, wherein the second moist cellulose ether has a water content of 60 to 90% by mass.

3. The method for producing a water-soluble cellulose ether according to claim 1, wherein the cellulose pulp is in form of a sheet or chips.

4. The method for producing a water-soluble cellulose ether according to claim 1, wherein the step of cooling the coarsely pulverized cellulose ether comprises cooling the coarsely pulverized cellulose ether in a range of from 0 to 40° C.

5. The method for producing a water-soluble cellulose ether according to claim 1, wherein the water-soluble cellulose ether is an alkyl cellulose, a hydroxyalkyl cellulose, or a hydroxyalkyl alkyl cellulose.

* * * * *